(12) United States Patent
Bourque

(10) Patent No.: US 10,889,877 B2
(45) Date of Patent: Jan. 12, 2021

(54) METAL OR ALLOY WITH IMPROVED PHYSICAL AND ELECTRICAL PROPERTIES

(71) Applicant: Bourque Industries, Inc., Phoenix, AZ (US)

(72) Inventor: John M. Bourque, Tempe, AZ (US)

(73) Assignee: Bourque Industries, Inc., Phoenix, AZ (US)

( * ) Notice: Subject to any disclaimer, the term of this patent is extended or adjusted under 35 U.S.C. 154(b) by 0 days.

(21) Appl. No.: 15/998,712

(22) Filed: Aug. 16, 2018

(65) Prior Publication Data

US 2019/0071752 A1 Mar. 7, 2019

Related U.S. Application Data

(63) Continuation of application No. 15/069,172, filed on Mar. 14, 2016, now abandoned, which is a
(Continued)

(51) Int. Cl.
*C22C 1/02* (2006.01)
*B32B 15/04* (2006.01)
(Continued)

(52) U.S. Cl.
CPC .................. *C22C 1/02* (2013.01); *B32B 3/04* (2013.01); *B32B 7/12* (2013.01); *B32B 15/04* (2013.01); *B32B 15/046* (2013.01); *B32B 15/20* (2013.01); *C22C 14/00* (2013.01); *C22C 21/00* (2013.01); *F41H 5/0464* (2013.01); *H01B 1/22* (2013.01); *H01B 1/24* (2013.01); *B22F 1/0085* (2013.01); *B22F 2009/041* (2013.01); *B22F 2009/045* (2013.01); *B22F 2998/10* (2013.01); *B32B 2571/02* (2013.01); *C22C 1/0425* (2013.01); *C22C 1/1084* (2013.01); *C22C 26/00* (2013.01); *C22C 33/0207* (2013.01); *C22C 2026/002* (2013.01)

(58) Field of Classification Search
CPC ............ C22C 1/02; C22C 1/0425; C22C 1/05; B22D 11/004
See application file for complete search history.

(56) References Cited

U.S. PATENT DOCUMENTS

2010/0117252 A1* 5/2010 Bourque .................. B22F 7/08
264/104
2013/0032254 A1* 2/2013 Waniuk ................... C22C 1/002
148/538

FOREIGN PATENT DOCUMENTS

WO WO-2014055802 A2 * 4/2014 ............. F28F 21/02

* cited by examiner

*Primary Examiner* — Scott R Kastler
(74) *Attorney, Agent, or Firm* — The Webb Law Firm

(57) ABSTRACT

Disclosed is a method of forming a treated material. The method includes providing a high-speed blender; adding a solvent and brass granules to the blender and blending at high speed until mixed; adding copper granules to the blender and mixing at high speed until mixed; adding carbon nanotubes and graphene to the blender and mixing until blended. The mixture of solvent, brass granules, copper granules, carbon granules, carbon nanotubes, and graphene are added to an additional mixture of brass and copper and mixed until all of the granules are uniformly saturated. The mixture is then dried to a powder. Thereafter, the dry powder may be added to ferrous or nonferrous metal(s) in a high temperature crucible and then heated until melted.

20 Claims, 11 Drawing Sheets

Related U.S. Application Data continuation-in-part of application No. 13/771,062, filed on Feb. 19, 2013, now Pat. No. 9,285,192, which is a continuation of application No. 12/830,798, filed on Jul. 6, 2010, now Pat. No. 8,375,840, which is a continuation-in-part of application No. 12/613,902, filed on Nov. 6, 2009, now abandoned.

(60) Provisional application No. 62/151,100, filed on Apr. 22, 2015.

(51) Int. Cl.
*C22C 14/00* (2006.01)
*C22C 21/00* (2006.01)
*F41H 5/04* (2006.01)
*B32B 7/12* (2006.01)
*B32B 15/20* (2006.01)
*B32B 3/04* (2006.01)
*H01B 1/22* (2006.01)
*H01B 1/24* (2006.01)
*B22F 9/04* (2006.01)
*B22F 1/00* (2006.01)
*C22C 1/04* (2006.01)
*C22C 1/10* (2006.01)
*C22C 26/00* (2006.01)
*C22C 33/02* (2006.01)

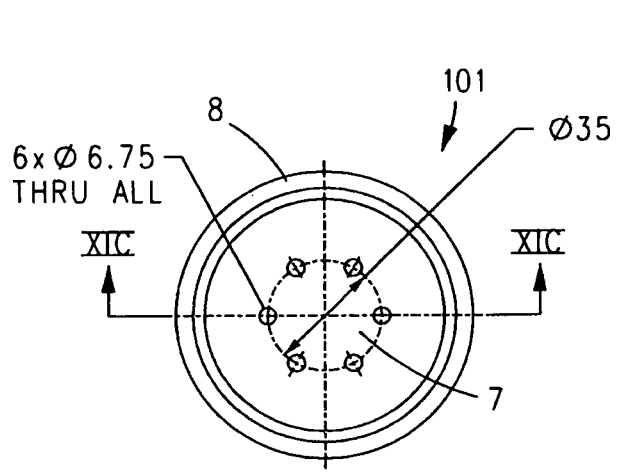
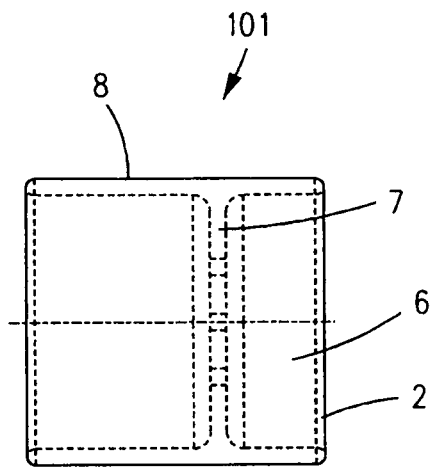
FIG. 11A    FIG. 11B
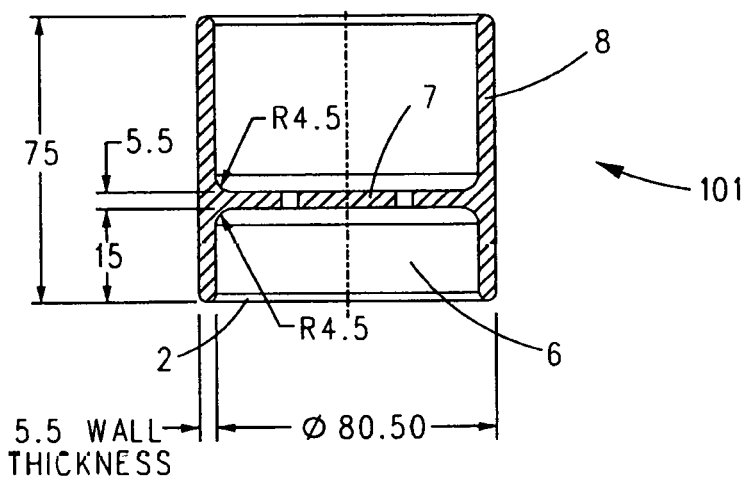
FIG. 11C

METAL OR ALLOY WITH IMPROVED PHYSICAL AND ELECTRICAL PROPERTIES

CROSS REFERENCE TO RELATED APPLICATIONS

This application is a continuation of U.S. application Ser. No. 15/069,172, filed Mar. 14, 2016, now abandoned, which claims the benefit of U.S. Provisional Application No. 62/151,100, filed Apr. 22, 2015 both of which are incorporated by reference herein. U.S. application Ser. No. 15/069,172 is a continuation-in-part of co-pending U.S. application Ser. No. 13/771,062, filed Feb. 19, 2013 (now U.S. Pat. No. 9,285,192), which is a continuation of U.S. application Ser. No. 12/830,798, filed Jul. 6, 2010 (now U.S. Pat. No. 8,375,840), which is a continuation-in-part of U.S. application Ser. No. 12/613,902, filed Nov. 6, 2009, now abandoned, all of which are incorporated by reference herein.

BACKGROUND OF THE INVENTION

Field of the Invention

This application relates generally to metal or a metal alloy. More specifically, this application relates to metal or a metal alloy employing carbon nanotubes and graphene in a ferrous and/or nonferrous metal or metals mixture.

Description of Related Art

Heat sinks are used as a passive heat exchanger with ambient liquid (often air) that cools a component generating heat during normal operations. The heat sink is not new technology, and is widely used across multiple applications. An important example is the light-emitting diode (LED) lamp. While such LED's are very bright and frequently have a nominal life of 20 years, actual life and effectiveness depends on avoiding overheating, that significantly impairs effectiveness. Cooling a very high wattage LED light source by a passive heat sink device has been done using existing technology, but may not be practical or feasible without additional cooling devices, such as fans or secondary cooling materials, moving fluids across or within the heat sink; fans and other moving parts require maintenance and if impaired detract from LED performance and life. All heat sinks have functional limits for cooling; there is a thermal mass limit wherein the heat sink can no longer dissipate additional heat as well as thermal conductivity rate as the maximum flow rate it can transfer heat away.
without significantly increasing the temperature of the heat source past a critical level, while conducting the heat away from the heat source and then releasing the heat into ambient air. The principal function for the heat sink follows Fourier's law of heat conduction with the heat transferring from components at a higher temperature toward the lower temperature heat sink.

Current heat sinks made from aluminum, for example, and used with a large size LEDs (about 250 watts) roughly requires a cubic foot of aluminum and 3,500-4,500 sq. ft. of surface area along with cooling fans or other external cooling mechanisms for maintaining operation temperatures for this size LED.

It would be desirable to provide a new metal or alloy that has improved or enhanced physical and electrical properties over current metals or alloys. In one nonlimiting example, it would be desirable to use this new metal or alloy for heat sinks. However, use of this new metal or alloy in other applications is envisioned.

SUMMARY OF THE INVENTION

Various preferred and nonlimiting examples or aspects of the present invention will now be described and set forth in the following numbered clauses:

Clause 1: A method of treating a material comprising:
(a) providing a high-speed blender;
(b) adding a solvent and brass granules to the blender and blending at high speed until mixed;
(c) adding copper granules to the blender and blending at high speed until mixed;
(d) adding carbon nanotubes (CNT) to the blender and blending until mixed;
(e) adding graphene to the blender and blending until mixed;
mixing a solution produced by steps (b)-(e) into an additional mixture of brass and copper granules and mixing until all granules are uniformly saturated with the solution; and
(g) drying the mixture of step (f) to a dry powder.

Clause 2: The method of clause 1, further including:
(h) mixing the dry powder with one or more metals in a high-temperature crucible and heating until melted, wherein each of the one or more metals is a ferrous and/or nonferrous metal.

Clause 3: The method of clause 1 or 2, wherein at least one of the brass and copper granules are passed through 100 mesh.

Clause 4: The method of any of clauses 1-3, wherein the solvent is acetone.

Clause 5: The method of any of clauses 1-4, wherein about 1.9 liters-3.79 liters (½ gallon-1 gallon of acetone) is added to about 0.45 kilograms-0.91 kilograms (1 pound-2 pounds) of brass granules and mixed.

Clause 6: The method of any of clauses 1-5, wherein about 0.45 kilograms-0.91 kilograms (1 pound-2 pounds) of copper granules is added to the acetone and brass mixture.

Clause 7: The method of any of clauses 1-6, wherein each instance of blending is repeated for about five minute periods.

Clause 8: The method of any of clauses 1-7, wherein 1-2 grams of carbon nanotubes (CNT) are added to the acetone-brass-copper mixture.

Clause 9: The method of any of clauses 1-8, wherein 1 gram of graphene is added to the acetone-brass-copper mixture.

Clause 10: The method of any of clauses 1-9, wherein in step (f) the mixture of brass and copper is a 1:1 ratio of brass and copper.

Clause 11: The method of any of clauses 1-10, wherein the mixture of brass and copper comprises about 9.1 kilograms-13.6 kilograms (20 pounds-30 pounds) of each.

Clause 12: The method of any of clauses 1-11, wherein 3.6 kilograms-9.1 kilograms (8 pounds-20 pounds) of the dry powder is added to about 41 kilograms-54.4 kilograms (90 pounds-120 pounds) of the one or more metals.

Clause 13: The method of any of clauses 1-12, wherein 5 kilograms-5.9 kilograms (11 pounds-13 pounds) of dry powder is added to about 41 kilograms-54.4 kilograms (90 pounds-120 pounds) of the one or more metals.

Clause 14: The method of any of clauses 1-13, wherein steps (b)-(e) are performed in any order to produce the solution.

Clause 15: The method of any of clauses 1-14, wherein any two or more of steps (b)-(e) are combined to produce the solution.

Clause 16: A method of treating a material comprising:
(a) mixing solvent, brass granules, copper granules, carbon nanotubes, and graphene;
(b) adding the mixture of step (a) to an additional mixture of brass and copper granules and mixing until all of the granules are uniformly saturated with a mixture of step (a); and
(c) drying the mixture of step (b) to a powder to form a treated material.

Clause 17: The method of clause 16, further including mixing the treated material with one or more ferrous and/or nonferrous metal(s) in a high temperature crucible and heating until melted.

Clause 18. The method of clause 16 or 17, wherein step (a) includes mixing in a blender.

BRIEF DESCRIPTION OF THE DRAWINGS

FIG. 10A is a perspective view of the heat sink with the heat source embedded in a circular area. FIG. 10B is a cross-sectional perspective view of the heat sink with the heat source shown at the bottom with multiple fins to dissipate heat;

FIGS. 11A, 11B and 11C show top, side, and cross-sectional views of another exemplary heat sink.

DETAILED DESCRIPTION OF THE INVENTION

Various nonlimiting examples will now be described with reference to the accompanying figures where like reference numbers correspond to like or functionally equivalent elements.

Persons of ordinary skill in the art will realize that the following description of the present invention is illustrative only and not in any way limiting. Other embodiments of the invention will readily suggest themselves to such skilled persons.

The present invention relates to solid-material compositions having enhanced physical and electrical properties as well as products formed using the material and methods for making the material and the products.

Numerous products can be made using the composition of the present invention. One aspect of the present invention includes a wash or bath employed to treat ingredients used to form the ballistic strike plates and assemblies according to the present invention. Since the volume of the wash or bath will vary with the particular application, an illustrative example is given for formulating the wash using one gallon of acetone. Persons skilled in the art will appreciate that the amounts of the ingredients disclosed in the example can be linearly scaled to formulate larger or smaller batches of the wash.

Figure 1:
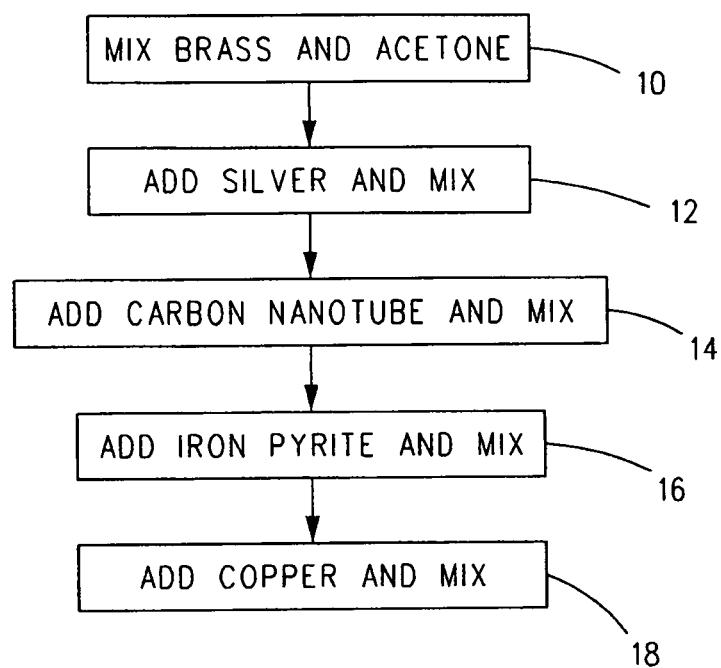
FIG. 1 is a diagram illustrating a process for making an example treating wash.

In one illustrative example shown in FIG. 1, at reference numeral 10, brass is mixed with acetone in a commercial blender. In the example, about 454 grams of brass (about 100 mesh or finer) is mixed with one gallon of acetone in a commercial blender at high speed for about 10 minutes or until a gold color appears at the surface of the acetone when the blender is stopped. At reference numeral 12, about 2 grams of silver granules are added and mixed. At reference numeral 14, carbon nanotube material is added and mixed. In the illustrative example, about one gram of multi-walled carbon nanotube material is added and mixed at high speed for about 5 minutes. At reference numeral 16, iron pyrite is added and mixed. In the illustrative example, about 33.5 grams of iron pyrite having a grain size of about 0.125 inch is added and mixed for a minimum of about 3 minutes at high speed. At reference numeral 18, copper is added and mixed. In the illustrative example, about 517 grams of copper (about 100 mesh or finer) is added and mixed at high speed for about 8 minutes until a slurry begins to form on the surface after the blender is turned off. The order in which the carbon nanotube material, the silver, the iron pyrite, and the copper are added is not critical.

After the ingredients have all been mixed as described, the liquid is strained and may be used as a wash or bath. All of the strained solid matter (herein "the first example treated material") may be stored for further use as disclosed herein. Once materials are processed, the wash liquid used may be collected and recycled by adding it to new batches of the wash liquid.

Once the wash liquid is formulated, constituent materials of products to be fabricated are washed using it. A sticky film merges with the constituent materials. The constituent materials are bonded together by drying and application of pressure, either in an oven or at room temperature.

According to one aspect of the present invention, ballistic strike plates formed from a special aluminum alloy are advantageously employed in armor assemblies, especially body armor assemblies. Since the amount of alloy needed to form plates of particular dimensions will vary with sizes of the plates needed for the particular application, an illustrative example is given for formulating a kilogram of the alloy. Persons skilled in the art will appreciate that the amounts of the ingredients disclosed in the example can be linearly scaled to formulate larger or smaller amounts of the aluminum alloy.

For a total weight of about 1 Kg of special aluminum alloy, about 130 grams of the first example treated material as described above and about 10 grams of silver powder are melted into about 860 grams of aluminum. The aluminum alloy formulated according to the present invention as just described is referred to herein as "special aluminum alloy."

The ballistic strike plates of the present invention may be formed by hot rolling ingots of the special aluminum alloy or may be formed by casting from the molten alloy. The ballistic strike plates of the present invention may be formed by hot rolling ingots of aluminum or other aluminum alloys or may be formed by casting from molten aluminum or other aluminum alloys but are believed to have a lower strength than the special aluminum alloy. Thickness of the finished ballistic strike plates will vary according to the particular application; for body armor the plates may be about 0.0625 inch to about 0.250 inch thick, depending on the threat level they are designed to meet. For vehicle or structure armor the ballistic strike plates may have a thickness of up to an inch or greater, depending on the threat level they are designed to meet.

Figure 2A:
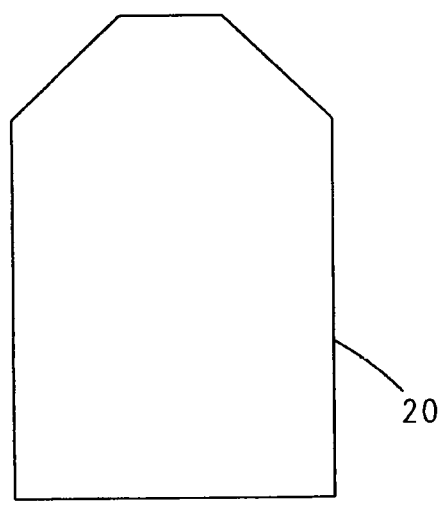
FIGS. 2A and 2B are diagrams illustrating front and top views of a ballistic strike plate assembly according to another aspect of the present invention.
Figure 2B:
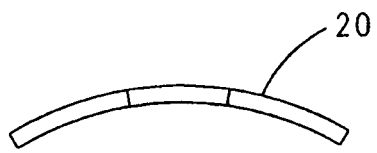

Referring now to FIGS. 2A and 2B, the composition is usefully employed to form a ballistic strike plate 20 that may be used in body armor according to another aspect of the present invention. FIG. 2A shows a front view of a ballistic strike plate assembly according to the present invention. FIG. 2B shows an illustrative top view of strike plate assembly 20. While the illustrative bottom view shown in FIG. 2A indicates that plate 20 is curved, persons of ordinary skill in the art will appreciate that plate 90 may be formed flat, depending on the application. For example, body-armor vests are sometimes constructed by supplying a vest made from a fabric material. The vests contain pockets into which ballistic strike plates or plate assemblies are inserted. The ballistic strike plate assemblies according to the present invention include assemblies formed in this manner and configured to be inserted into the pockets of such fabric vests.

Figure 3A:
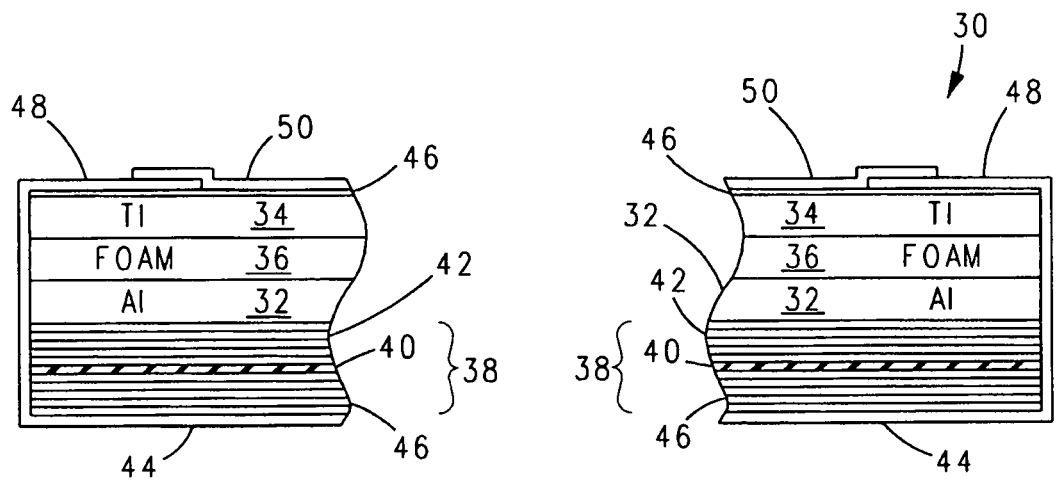
FIGS. 3A and 3B are diagrams illustrating a ballistic strike plate assembly according to another aspect of the present invention.
Figure 3B:
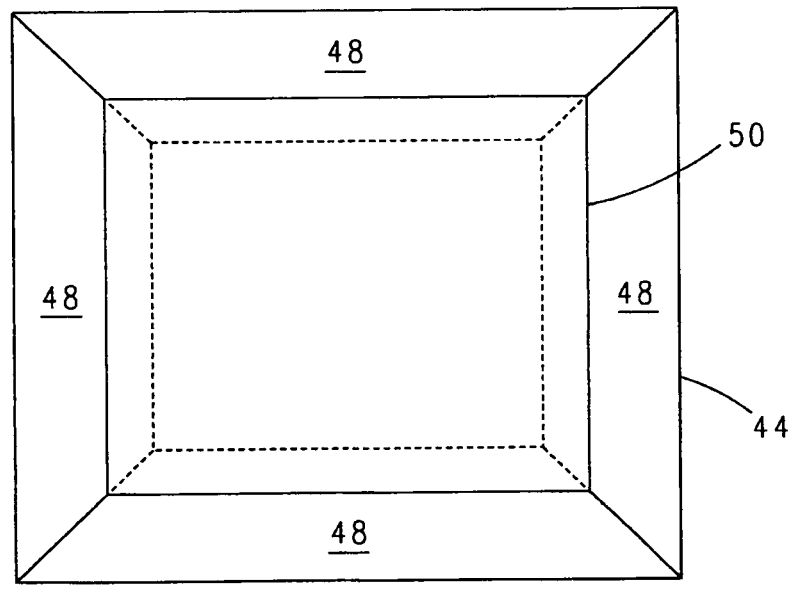

Referring now to FIGS. 3A and 3B, diagrams illustrate a cross-sectional view and a face view, respectively, of a ballistic strike plate assembly 30 according to another aspect of the present invention.

An illustrative ballistic plate assembly according to the present invention is formed using a special aluminum alloy plate 32 made according to the present invention. In one illustrative embodiment of the invention, plate 32 may have a thickness of about 0.125 inches. A grade II titanium plate 34 such as a 0.125 inch thick plate CAS 7440-32-6 available from Allegheny Ludlum Corp., of Brackenridge, Pa. is also used. While in the present example the two plates have the same thickness, this is not necessary for practicing the present invention. Persons of ordinary skill in the art will recognize that the thicknesses of plates 32 and 34 will be selected according to the threat level to which the ballistic strike plate assembly will be designed to encounter.

A sheet of ballistic gap foam 36, having a thickness of about 0.125 inches in an illustrative embodiment, having adhesive disposed on both surfaces, such as model DMG-FM-004, manufactured by DMG, a division of Hisco, of Tempe Ariz., is adhered to a first surface of one of the plates. A first surface of the other plate is adhered to the other surface of the foam sheet 36.

A ballistic fabric plate 38 is made using multiple layers of a ballistic fabric such as Spectra II available from Honeywell of Colonial Heights, Va. In a presently preferred embodiment, a first stack of a plurality of layers of such fabric. A sheet 40, formed from a material such as a titanium sheet, having a thickness of about 0.05 inches in an illustrative embodiment, such as a CAS 7440-32-6 plate from Allegheny Ludlum Corp. of Brackenridge, Pa., is placed over the stack and a second stack of a plurality of layers of such fabric are placed over the titanium sheet. In one illustrative embodiment of the invention, fifty sheets are employed in the first and second stacks. The assembled stacks are then heated to about 275.degree. F. for about four hours under a pressure of, for example, 10 tons to form a ballistic fabric plate. The ballistic fabric plate is adhered to the exposed second surface of the aluminum plate 32 using a double-sided adhesive tape 42, such as 3M-VHB 4950, available from 3M Corporation of St. Paul, Minn.

The ballistic plate assembly 30 is then covered with a first sheet 44 of ballistic wrap such as M-7 Spall System Nylon PSA from DMG a division of Hisco of Tempe Ariz. The first sheet 44 of ballistic wrap is held in place by a layer of adhesive 46. The edges 48 of the first sheet of ballistic wrap 44 are folded over the four edges of the assembly. A second smaller sheet of ballistic wrap 50 is placed over the portion of the second surface of the aluminum plate not covered by the folded over edges of the first sheet of ballistic wrap. The second sheet 50 of ballistic wrap is also held in place by a layer of adhesive 46. The titanium face of the assembly faces outward towards the threat.

Figure 4A:
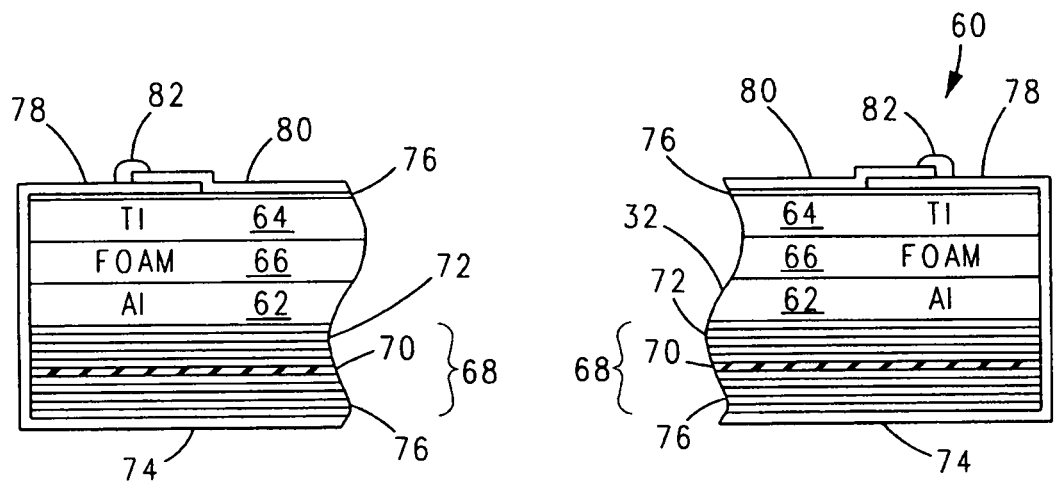
FIGS. 4A and 4B are diagrams illustrating a ballistic strike plate assembly according to another aspect of the present invention.
Figure 4B:
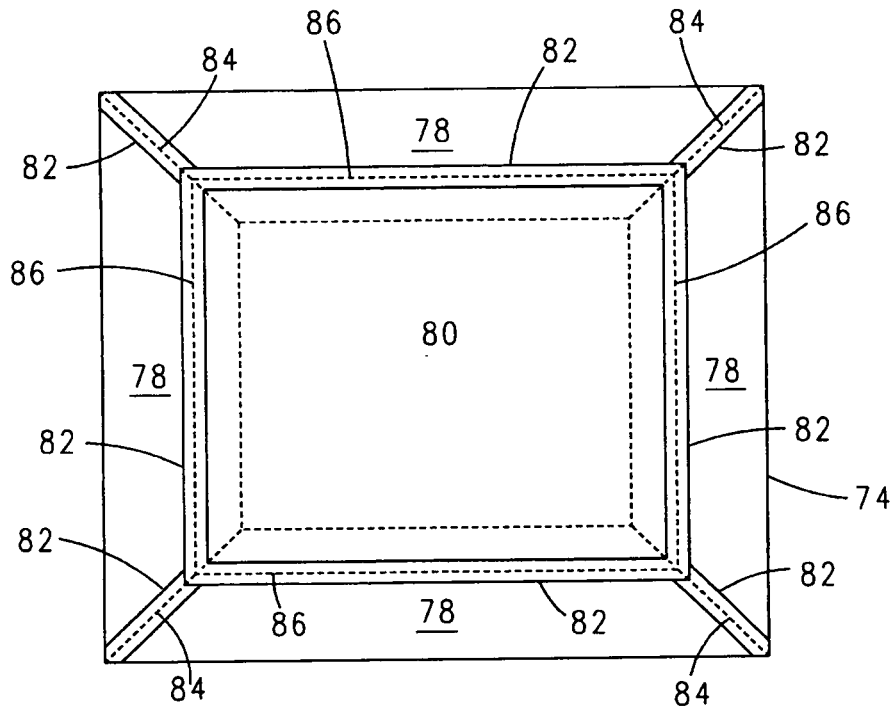

Referring now to FIGS. 4A and 4B, diagrams illustrate a cross-sectional view and a face view, respectively, of a body-armor plate assembly according to another aspect of the present invention.

According to the aspect of the present invention illustrated in FIGS. 4A and 4B, an armor plate assembly 60 is formed using a special aluminum alloy plate 62 made according to the teachings of the present invention. In one illustrative embodiment of the invention, plate 22 may have a thickness of about 0.125 inches. A grade II titanium plate 64 such as a 0.125 inch thick plate CAS 7440-32-6 available from Allegheny Ludlum Corp., of Brackenridge, Pa. While in the present example the two plates have the same thickness, this is not necessary for practicing the present invention. Persons of ordinary skill in the art will recognize that the thicknesses of plates 62 and 64 will be selected according to the threat level to which the ballistic strike plate assembly will be designed to encounter.

A first surface of a sheet of ballistic gap foam 66, having a thickness of about 0.125 inches in an illustrative embodiment, having adhesive disposed on both faces, such as model DMG-FM-004, manufactured by DMG, a division of HISCO, of Tempe Ariz., is adhered to a first surface of one of the plates 62 and 64. A first surface of the other plate is adhered to the other surface of the foam sheet 66.

A ballistic backing plate 68 is made using multiple layers of a ballistic fabric such as Spectra II available from Honeywell of Colonial Heights, Va. In a presently preferred embodiment, a stack is assembled from a plurality of layers of such fabric. A sheet 70 formed from a material such as a titanium sheet, having a thickness of about 0.05 inches in an illustrative embodiment, such as a CAS 7440-32-6 plate from Allegheny Ludlum Corp. of Brackenridge, Pa. is placed over the stack and a second stack of a plurality of layers of such fabric are placed over the titanium sheet. In one illustrative embodiment of the invention, fifty sheets are employed in the first and second stacks. The assembled stacks are then heated to about 275.degree. F. for about four hours under a pressure of, for example, 10 tons to form ballistic fabric plate 68. The ballistic fabric plate 68 is adhered to the exposed second surface of the aluminum plate 62 using a double sided adhesive tape, such as 3M-VHB 4950, available from 3M Corporation of St. Paul, Minn.

The ballistic plate assembly 60 is then covered with a first sheet 74 of ballistic wrap such as M-7 Spall System Nylon PSA from DMG a division of Hisco of Tempe Ariz. The first sheet 74 of ballistic wrap is held in place by a layer of adhesive 76. The edges 78 of the first sheet of ballistic wrap 74 are folded over the four edges of the assembly. A second smaller sheet of ballistic wrap 80 is placed over the portion of the second surface of the aluminum plate not covered by the folded over edges of the first sheet of ballistic wrap. The second sheet 80 of ballistic wrap is also held in place by a layer of adhesive 76. The titanium face of the assembly faces outward towards the threat.

A coating 82, for example an elestomeric coating such as Plasti-Dip coating from Plasti-Dip International of Blaine, Minn., is formed over the seams 84 made by the intersection of the edges of folded-over portions 78 of the first sheet of ballistic wrap layer 74 and at the outer edges 86 of the second sheet 80 of the ballistic wrap.

In another example, a second example treated material is disclosed hereafter that can be mixed with any ferrous or nonferrous metal or combination of two or more ferrous and/or nonferrous metals on the periodic table of the elements to form a metal or metal alloy having improved properties, especially improved electrical and thermal conductance and hardness. An example target application for this new metal or alloy is a heat sink for a 255 Watt LED light source that outputs 25,000 lumens of light without using fans. Requirements for this LED light source included operation temperatures less than 85° C. for prolonged intervals of time (e.g., overnight) without causing thermal damage to the LED light source. Another requirement was no moving parts or mechanisms requiring external supervision or maintenance, because failure to such moving parts would cause failure of the LED light source. The LED light source by itself should also be able to stay operational for over 20 years without maintenance.

Figure 5:
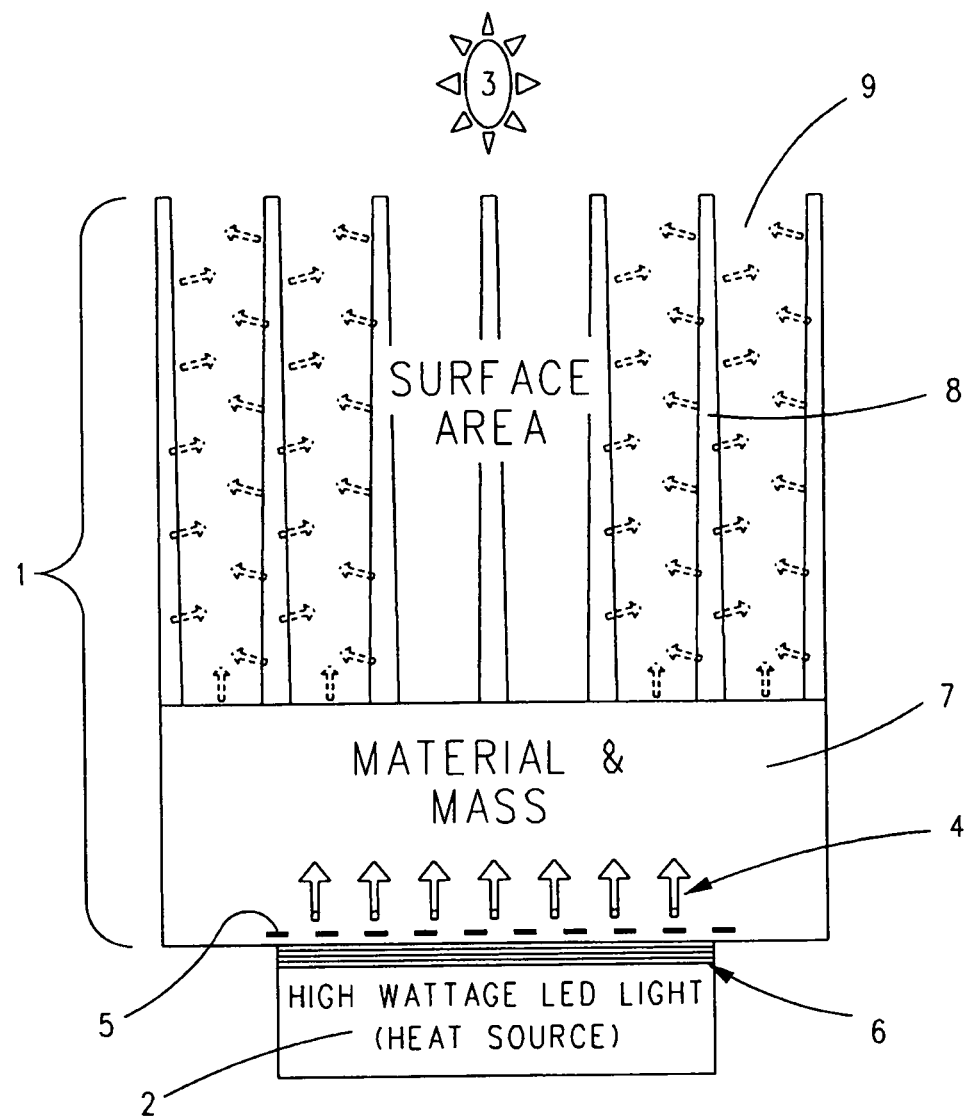
FIG. 5 is a schematic of the heat sink with a high-wattage LED light source which is also an exemplary heat source.
Figure 6A:
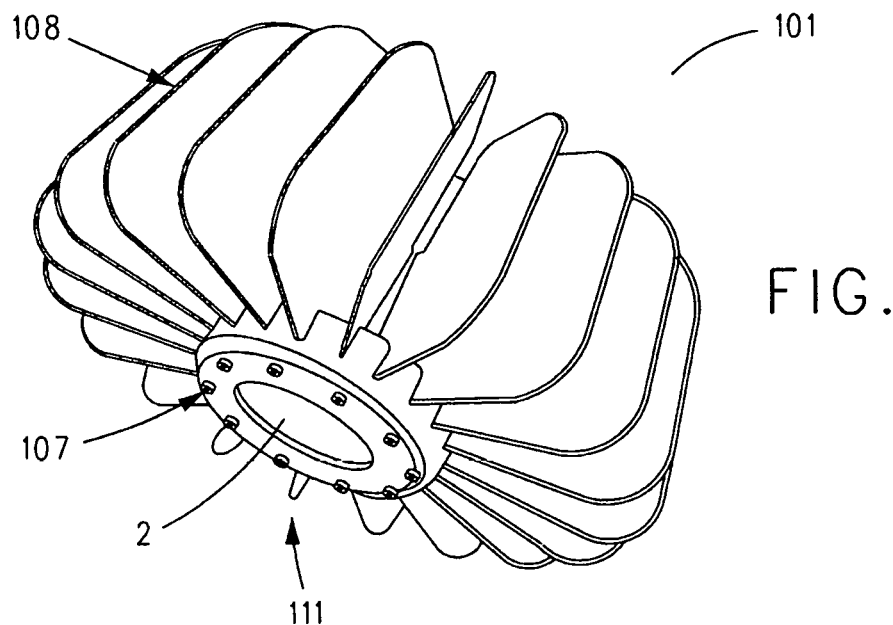
FIGS. 6A and 6B are perspective views (6B in partial cross-section) of one example heat sink.
Figure 6B:
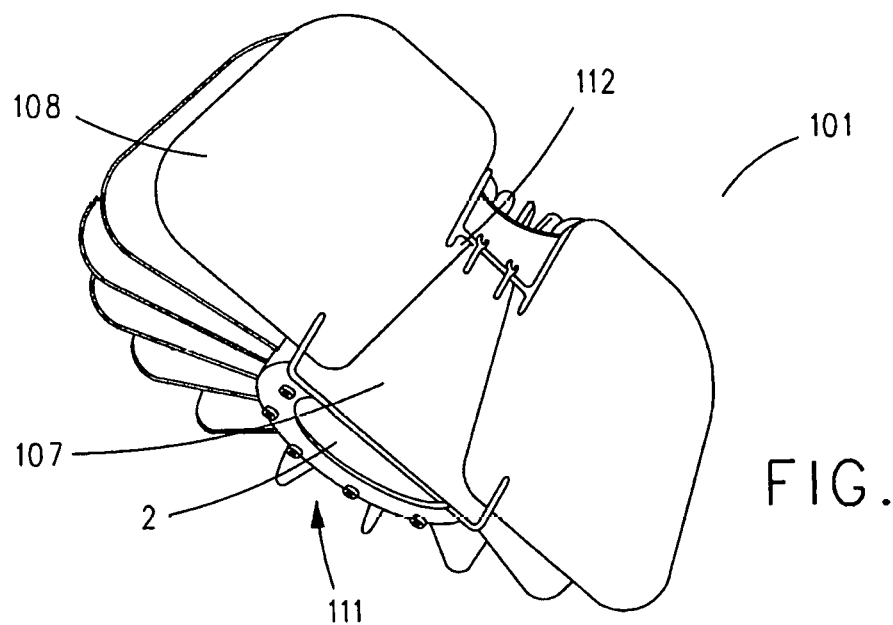
Figure 7A:
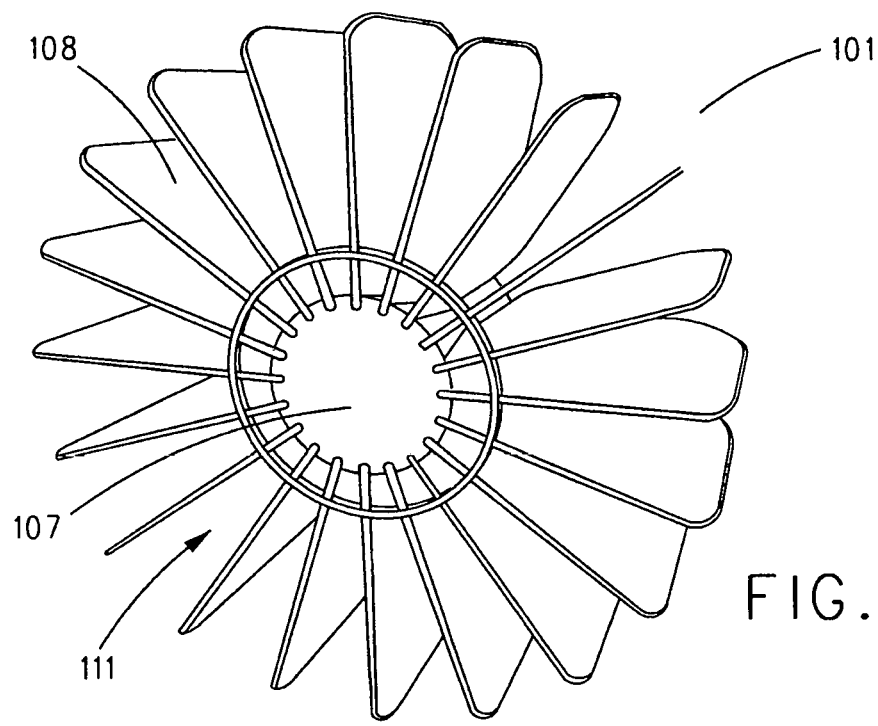
FIG. 7A AND 7B are perspective views (7B in partial cross-section) of the example heat sink shown in FIGS. 6A and 6B.
Figure 7B:
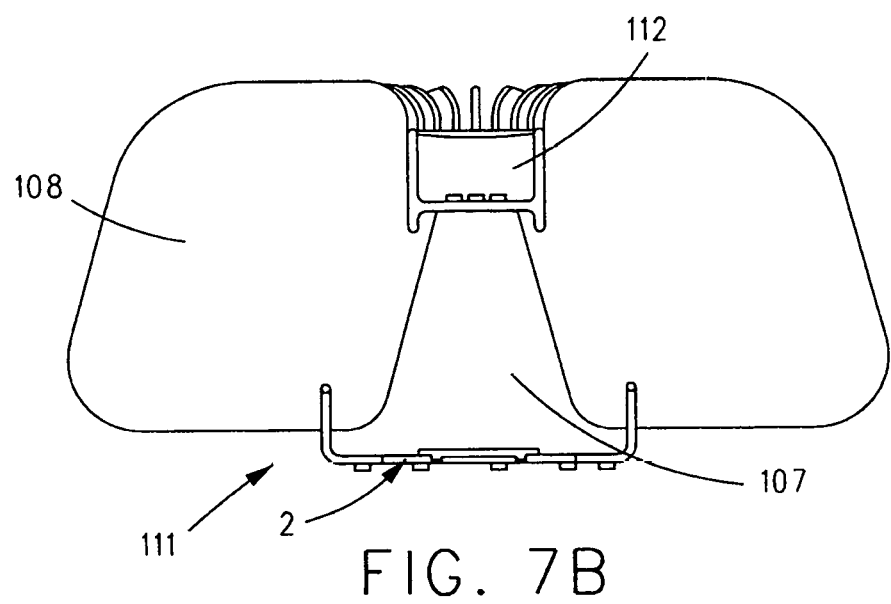

Turning to FIG. 5, an example heat sink 1 is illustrated. Generally, heat sinks are passive heat exchangers that cool an attached or adjacent heat source, such as an LED light source by dissipating heat into the surrounding medium. In general, the performance of a heat sink is affected by the material(s) and properties of the materials forming the heat sink, the mass of the material, and the surface area available for heat exchange with a cooler medium than the heat source. In an example, a heat sink for an LED light source can optionally be accompanied by a fan for faster dispersion of heat therefrom.

The example heat sink 1 includes a base plate 7 that abuts the LED light source 2 (i.e., a single LED or multiple LEDs). LED light source 2 can have a base plate 6 to provide a surface for heat transfer to heat sink base plate 7. Thermal paste or other greases 5 can be optionally used to improve heat transfer between abutting surfaces of base plates 6 and 7. Base plate 7 can have various shaped fins extending from base plate 7 that serve to provide surface area for heat exchange to ambient air 3 surrounding heat sink 1. Heating of air 9 adjacent fins 8 of heat sink 1 induces a natural conduction generating air flow cooling heat sink. Operation of the heat sinks 1, 101 (FIGS. 6A-7A) requires airflow 3, 9.

Designs for heat sink 1 are presented in FIGS. 6A-11C. In an example, the design of heat sink 101 is governed by the same principles used for heat sink 1. It is believed that when used to make parts of a heat sink, such as fins 8, the new metal or alloy formed using the second example treated material (discussed hereinafter) can improve the efficiency of heat exchange, allowing the heat sink to handle cooling of higher heat-generating sources, such as LED light source 2. In an example, the mass of a base plate 107 of heat sink 101 is selected to handle the wattage of LED light source 2. However, this mass is less than what would be required by heat sinks made from the prior art metals or alloys.

In an example, the shape of the base plate 107 shown in FIGS. 6A-7B was made collinearly bell shape (shown best in FIG. 7B) to focus the mass directly behind the LED light source 2 to absorb heat efficiently. However, any shape can be used for base plate 107 made from the new metal or alloy. In an example, the thermal mass of base plate 107 must still stay below a given saturated equilibrium, where it can no longer absorb additional heat from the LED light source 2. Fins 108 made from the new metal or alloy stay cooler and are more effective exchanging heat with air than fins 108 made from prior art metals or alloys. In an example, fins 108 can be modularly attached to the base plate 107 to allow for ease of trying different fin designs. Optionally, fins 108 can be directly cast with base plate 107. Heat sink 101 can optionally include an upper attachment 111 and/or a lower attachment 112 to assemble fins 108 to base plate 107 and to provide additional cooling surface area. Heat source 101 can include additional structures (not shown), such as a focusing lens for LED light source 2 and/or structural mounting components for supporting heat sink 101 for use.

In developing heat sink 101, fundamental relationships used for designing heat sinks were questioned with increasing surface area. Variations in heat sink mass appeared to exert a greater effect on the overall thermal conductivity rate than adjusting the amount of the exposed surface area to the ambient air. While not wishing to be bound by any particular theory, it is believed this is due to the efficacy of the conductivity of the new metal or alloy being greater than that of prior art metallic materials. The new metal or alloy also transfers heat from LED light source 2 at a greater rate. Sufficient mass was required to stay within the thermal mass limit for the LED light source 2 prior to saturation, where saturation was taken as having insufficient mass, where equilibrium states in temperatures between the LED's base plate 6 and adjacent surface material within the heat sink would approach allowing temperatures in the LED to increase above operational limits.

Figure 8A:
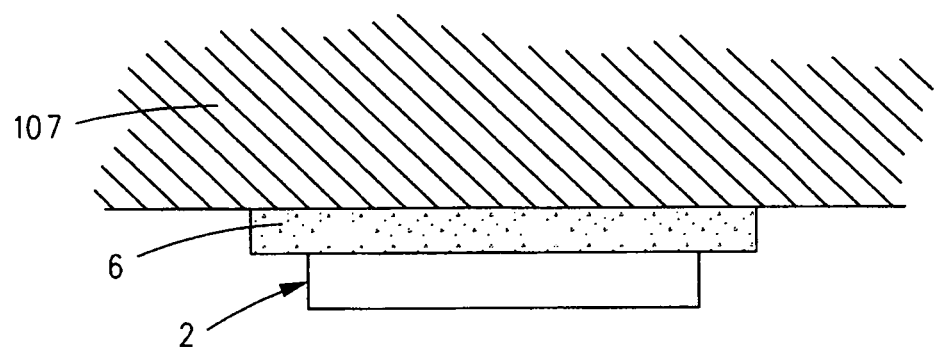
FIGS. 8A, 8B and 8C are schematics illustrating heat transfer from the LED back plate to the heat sink by surface mounting (FIG. 8A), pocket mounting (FIG. 8B) and encasement mounting (FIG. 8C)
Figure 8B:
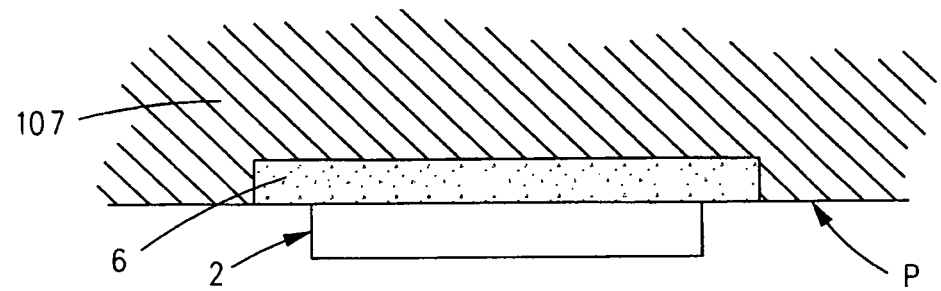
Figure 8C:
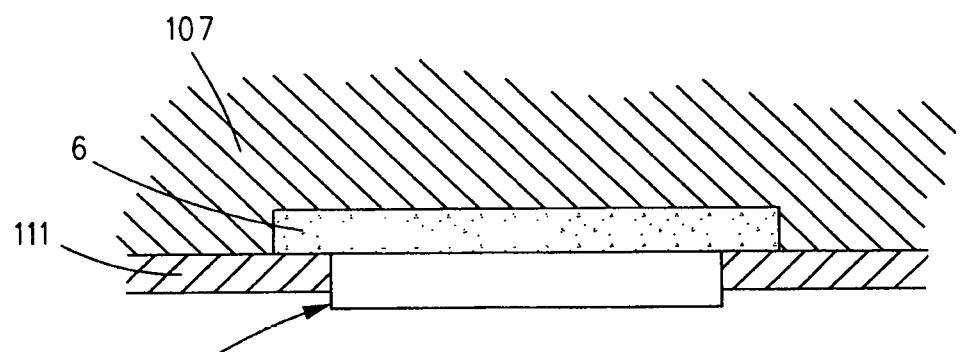
Figure 9:
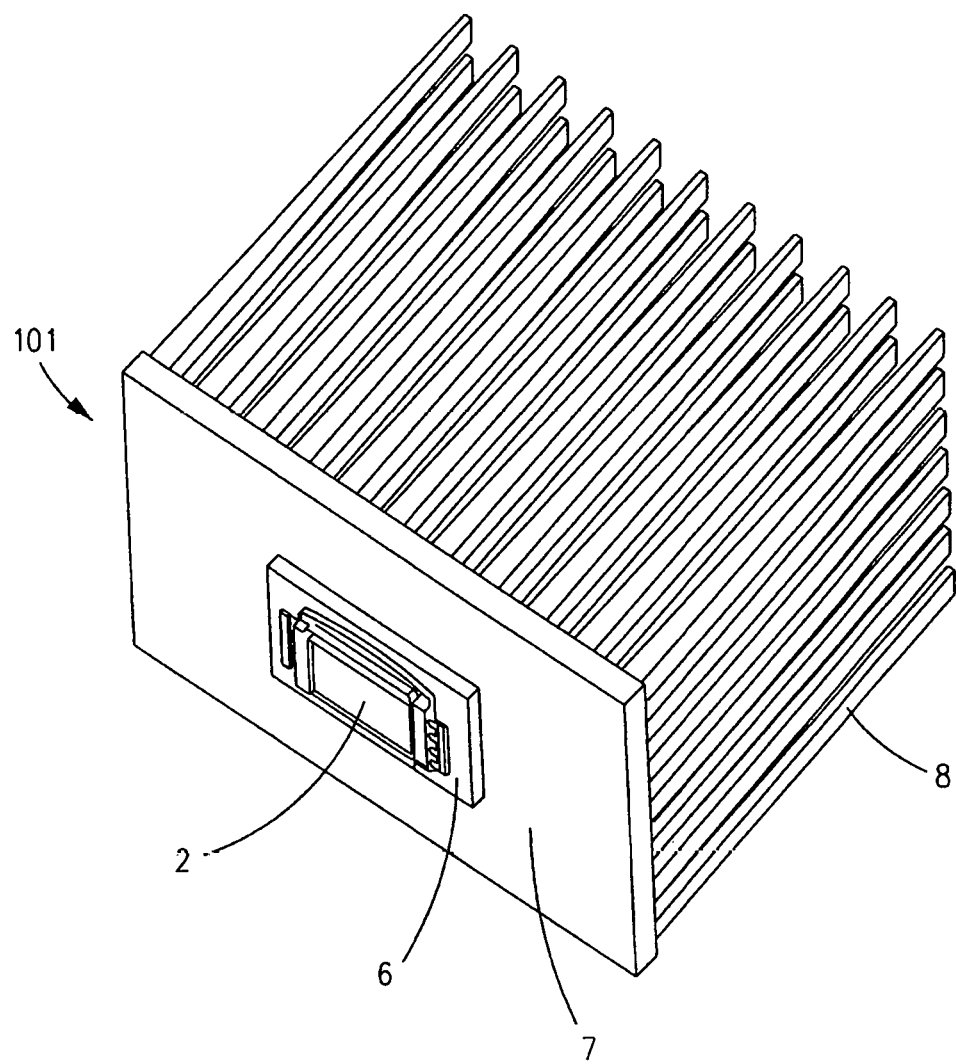
FIG. 9 is a perspective view of another example heat sink with numerous separated pins to dissipate heat.
Figure 10A:
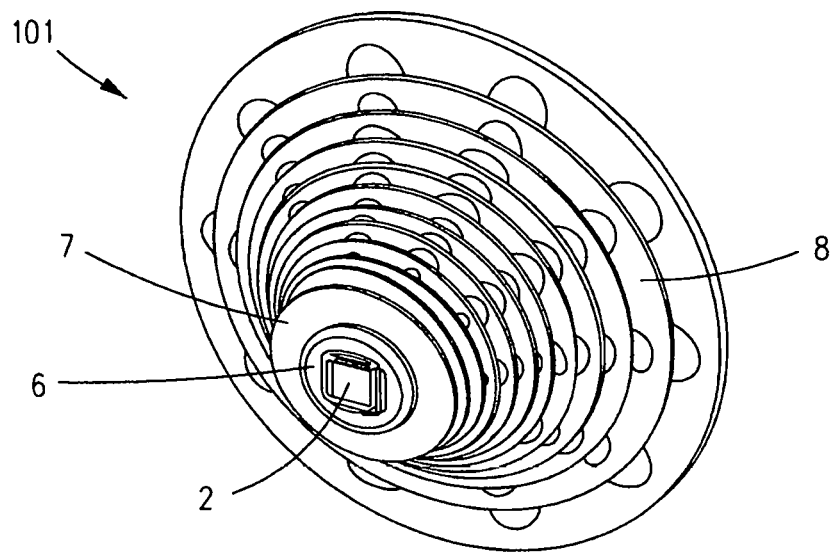
FIGS. 10A and 10B are perspective views of another example heat sink.
Figure 10B:
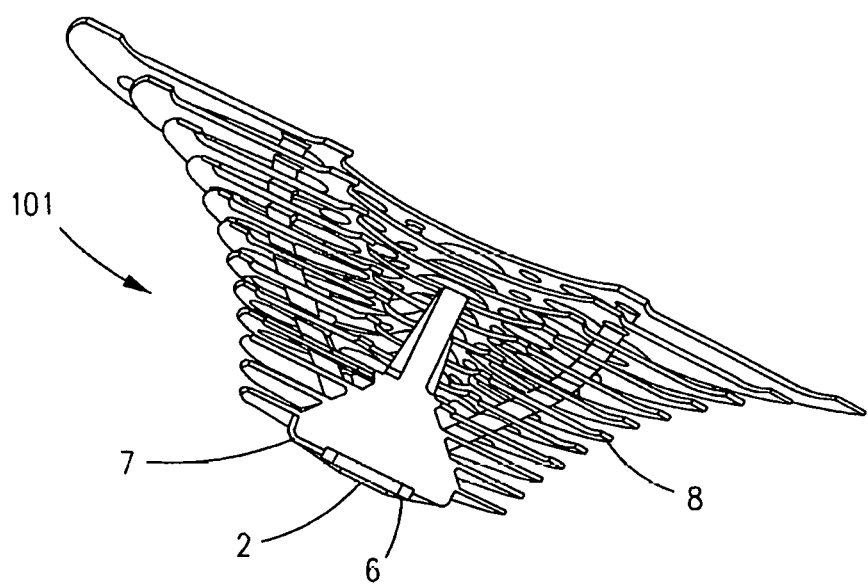

The physical mounting/placement of LED light source 2 and its backing plate 6 with the base plate 7, 107 of heat sink 1, 101 played a role in the effectiveness of heat transfer as will now be discussed with reference to FIGS. 8A-C. In an example, surface mounting back plate 6 of LED light source 2 to heat sink 107 of heat sink 101 provides surface-to-surface contact (FIG. 8A). In another example, submerging back plate 6 of LED light source 2 into a pocket P of base plate 107 improves heat transfer, particularly with including edges of the base plate 6 within base plate 107 to wick heat from around a perimeter of base plate 6 (FIG. 8B). In another example, encasement of base plate 6 on all exposed surfaces with components, e.g., upper attachment 111 and base plate 107 of heat sink 101, provided the best heat transfer (FIG. 8C).

In an example, various materials 6 can be inserted between base plate 6, 106 and base plate 7, 107 including, but not limited to, grease, insulating mica washer, thermally conductive tape, epoxy, wire-form Z clips, standoff spacers, push pins with expandable ends, and flat sprig clips. These materials can optimize thermal conductivity between base plate 6, 106 and base plate 7, 107, which may not have perfectly even surfaces for maximal heat transfer.

In an example, carbon nanotubes (CNT) and graphene are used to form the new metal or alloy. It has been observed that the addition of small amounts of CNT and graphene to a ferrous and/or nonferrous metal, and/or a combination of ferrous and/or nonferrous metals results in higher heat conductivity in the resulting metal or alloy. In an example, two attempts to measure thermal conductivity of the new metal or alloy formed with CNT and graphene exceeded the heat conductivity measurable on equipment routinely used to measure heat conductivity. CNT (single- or multiple-walled carbon nanotubes) and graphene are available from many commercial sources.

In an example, the second example treated material (described hereinafter) can be mixed with one or more of the following to form one example of the new metal or alloy: aluminum (new or recycled), copper, tungsten, carbide, silver, steel, lead, and combinations thereof. The thus formed new metal or alloy can be used in a variety of composites including, for example, beryllium oxide in a beryllium matrix. The new metal or alloy can also be utilized with diamonds, and/or silicon carbide in aluminum matrix, for example, a matrix of diamond in a copper-silver matrix, and plastics.

In an example, a variety of fin 8, 108 arrangements were tested, including straight and curved fins that were removably attached, or molded into the heat sink. In an example, fins are cross-cut at regular intervals to enable more air flow. In an example, the heat sink design described herein must be weighted under the heat source more than typical designs. Larger lateral projections were not as successful.

Figure 12:
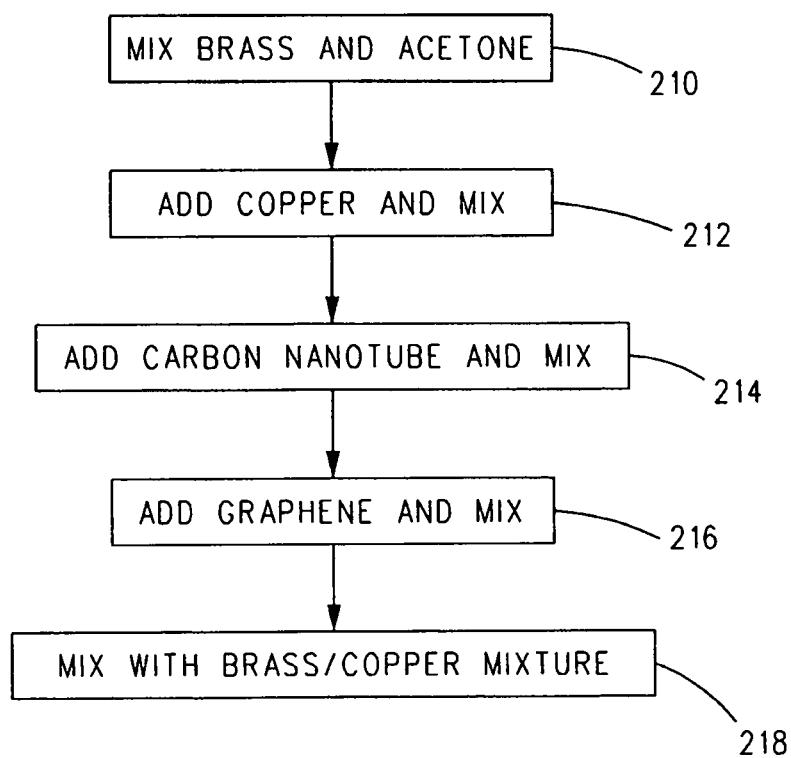
FIG. 12 is a diagram illustrating a process for making an example treated material that can be mixed with any ferrous and/or nonferrous metal or combinations of ferrous and/or nonferrous metals (alloys) on the periodic table of the elements to form a metal or alloy having improved properties, especially improved electrical and thermal conductance and hardness.

An example of a process for forming the second example treated material will now be described with reference to FIG. 12. In this example, the second example treated material can be used with any ferrous and/or nonferrous metal or combination of metals on the periodic table of the elements, including, without limitation, aluminum (new or recycled), copper, steel, lead, and combinations thereof. The second example treated material can also be utilized to treat non-metallic materials, such as plastic.

In an example, at reference numeral 210 brass is mixed with acetone in a commercial blender. In an example, about 454 grams (1 pound) of brass granules (in an example, 100 mesh or finer) is mixed with about 1.9 liters (0.5 gallons) of acetone in a commercial blender at high speed until a gold color appears at the surface of the acetone when the blender is stopped. In an example, the brass granules and acetone were mixed in about five-minute increments until the gold color appeared at the surface of the acetone. This mixing produces an acetone-brass (AB) combination.

At reference numeral 212, about 454 grams (1 pound) of copper granules (in an example, 100 mesh or finer) are added to the AB combination and mixed for about 5 minutes to ensure complete mixing. This produced an ABC combination.

At reference numeral 214, about one gram of carbon nanotube (CNT) material is added to the ABC combination in the blender to form an ABC-CNT mixture. This ABC-CNT mixture was mixed for about five minutes producing an ABC-CNT combination.

Next, at reference numeral 216, one gram of graphene (G) is added to the ABC-CNT combination in the blender mixed at high speed for about five minutes to form an ABCG-CNT mixture.

At reference numeral 218, the ABCG-CNT combination is mixed with a mixture of brass and copper granules (in an example, each of which is 100 mesh or finer). In an example, the mixture of brass and copper granules of step 218 is a 50/50 or 1:1 mixture of brass and copper granules. In an example, the 50/50 mixture of brass and granules includes, for example, about 11.3 kilograms (25 pounds) of brass and about 11.3 kilograms (25 pounds of copper) to produce an ABCG25-CNT mixture that is mixed for about ten minutes and/or until all the materials are uniformly saturated.

The order in which the brass, copper, CNT, graphene, and brass/copper mixture are combined or mixed is not crucial. Moreover, two or more of steps 210-216 can be combined into a single step if desired. Accordingly, the foregoing example is not to be construed in a limiting sense.

The process of mixing acetone, brass, and copper in steps 210 and 212 with a commercial blender has the effect of knocking small particles of brass and copper from the brass and copper granules, which small particles become suspended in the acetone due to the action of the commercial blender running at high speed. Once these small particles are in suspension within the acetone, they can readily combine with the CNT, graphene, and mixture of brass and copper granules in steps 214-218.

After all of the ingredients in steps 210-218 have been mixed, the ABCG25-CNT combination is fully dried to form an ABCG25-CNT powder that is free of residual solvent. This ABCG25-CNT powder is the second example treated material.

The thus prepared second example treated material can be mixed with any ferrous or nonferrous metal, or combinations of ferrous and/or nonferrous metals of the periodic table of the elements in a high-temperature crucible with induction heater for casting metals. Hereinafter, the "ferrous or nonferrous metal" or "combinations of ferrous and/or nonferrous metals" will be individually or collectively referred to as "the ferrous and/or nonferrous metal(s)".

The ferrous and/or nonferrous metal(s) can be the same or different from those in the second example treated material.

In an example, the second example treated material can be added at the start of melting the ferrous and/or nonferrous metal(s) prior to casting. However, in another example, the second example treatment material can be added to the ferrous and/or nonferrous metal(s) at any time.

In an example, a ratio of the second example treated material to the ferrous and/or nonferrous metal(s) can be about 5 kilograms-5.9 kilograms (11 pounds-13 pounds) of the second example treated material to 41 kilograms-54.4 kilograms (90 pounds-120 pounds) of the ferrous and/or nonferrous metal(s). In an example, the transition of the ferrous and/or nonferrous metal(s) mixed with the second example treated material required a higher temperature than normally used for said ferrous and/or nonferrous metal(s) not mixed with the second example treated material and was in the range of about 815° C. to 1538° C. (1500° F. to 2800° F.), depending on the ferrous and/or nonferrous metal(s) used. In an example, degassing means were utilized during mixing of the second example treated material with the ferrous and/or nonferrous metal(s) to ensure safety.

In the foregoing example, acetone was used as a solvent. However, it is envisioned that other solvents can be utilized, examples of other suitable solvents include polar or nonpolar solvents. Examples of polar solvents include water, acetone, alcohol, dimethylformamide, n-methyl-2-pyrrolidone, dichloroethylene, or chloroform.

The times, weights, and ratios of the weights given above are examples for the purpose of illustration only and may be varied by one skilled in the art to obtain desired results. For example, in each of steps 210 and 212 above, anywhere between 0.34 kilograms-0.9 kilograms (0.75 pounds-2 pounds) of brass and copper can be added; the solvent can vary from about 1.9 liters-7.6 liters (0.5 gallon-2 gallons). CNT can be varied from 0.5 grams-10 grams, in an example from 0.6 grams-5 grams, in another example from 0.8 grams-2 grams. In addition, as discussed above, the order of steps 210-218 can be varied by one skilled in the art and/or steps 210-218 can be combined as necessary for convenience. For example, without limitation, the brass and copper granules of steps 210-212 may be added to the acetone in the blender at the same time. The ABC25G-CNT powder can be optionally filtered after being dried.

The weights of brass and copper discussed above in connection with step 218 were chosen for effectiveness as well as convenience with the available equipment and can be varied depending on desired parameters as well as sizes of mixing containers. The weight of each of brass and copper in step 218 can range from 6.8 kilograms-22.6 kilograms (15 pounds-50 pounds), in another example between about 9.1 kilograms-15.9 kilograms (20 pounds-35 pounds), and in another example between about 10 kilograms-13.6 kilograms (22 pounds-30 pounds). Similarly, the amount of the second example treated material, namely, the ABCG25-CNT powder can be varied when added to the ferrous and/or nonferrous metal(s). Accordingly, the foregoing examples including weights and/or ratio of weights and mixing times are not to be construed in a limiting sense but only as examples of forming the second example treated material and using the second example treated material to form the treated metal or alloy.

Before or during the melting of the ferrous and/or nonferrous metal(s) in the casting operation, other additives can be added, such as, in an example, metallic alloys, plastic, cloth, or any combination thereof.

It is believed that using the second example treated material enables the material being treated, for example, the ferrous and/or nonferrous metal(s), to achieve greater electrical and mechanical properties than said ferrous and/or nonferrous metal(s) would achieve without the second example treated material. It is also believed that one or more of the following properties of ferrous and/or nonferrous metal(s) mixed with the second example treated material are improved by use of the second example treated material in the manner discussed above: thermal conductance, electrical conductance, hardness, and resistance to microwaves. In addition, in an example, it is believed that the second example treated material and/or the ferrous and/or nonferrous metal(s) treated with the second example treated material can be part of a coating that can be applied in any suitable and/or desirable manner to other materials such as metal, plastic, cloth, etc. to form a coating on said other materials.

Another application of the ferrous and/or nonferrous metal(s) treated with the second example treated material is electrical wire. In an example, the ferrous and/or nonferrous metal(s) treated with the second example treated material can be used to make electrical wire grade copper or aluminum.

The examples have been described with reference to the accompanying figures. Modifications and alterations will occur to others upon reading and understanding the foregoing examples. Accordingly, the foregoing examples are not to be construed as limiting the disclosure.

The invention claimed is:

1. A method of treating a material comprising:
   (a) providing a high-speed blender;
   (b) adding a solvent and brass granules to the blender and blending at high speed until mixed;
   (c) adding copper granules to the blender and blending at high speed until mixed;
   (d) adding carbon nanotubes (CNT) to the blender and blending until mixed;
   (e) adding graphene to the blender and blending until mixed;
   (f) mixing a solution produced by steps (b)-(e) into an additional mixture of brass and copper granules and mixing until all granules are uniformly saturated with the solution; and
   (g) drying the mixture of step (f) to a dry powder.

2. The method of claim 1, further including:
   (h) mixing the dry powder with one or more metals in a high-temperature crucible and heating until melted, wherein each of the one or more metals is a ferrous and/or nonferrous metal.

3. The method of claim 1, wherein at least one of the brass and copper granules are passed through 100 mesh.

4. The method of claim 1, wherein the solvent is acetone.

5. The method of claim 1, wherein about 1.9 liters-3.79 liters (½ gallon-1 gallon of acetone) is added to about 0.45 kilograms-0.91 kilograms (1 pound-2 pounds) of brass granules and mixed.

6. The method of claim 1, wherein about 0.45 kilograms-0.91 kilograms (1 pound-2 pounds) of copper granules is added to the acetone and brass mixture.

7. The method of claim 1, wherein each instance of blending is repeated for about five minute.

8. The method of claim 1, wherein, in step (d), 1-2 grams of carbon nanotubes (CNT) are added.

9. The method of claim 1, wherein, in step (e), 1 gram of graphene is added.

10. The method of claim 1, wherein in step (f) the mixture of brass and copper is a 1:1 ratio of brass and copper.

11. The method of claim 10, wherein the mixture of brass and copper comprises about 9.1 kilograms-13.6 kilograms (20 pounds-30 pounds) of each.

12. The method of claim 2, wherein 3.6 kilograms-9.1 kilograms (8 pounds-20 pounds) of the dry powder is added to about 41 kilograms-54.4 kilograms (90 pounds-120 pounds) of the one or more metals.

13. The method of claim 12, wherein 5 kilograms-5.9 kilograms (11 pounds-13 pounds) of dry powder is added to about 41 kilograms-54.4 kilograms (90 pounds-120 pounds) of the one or more metals.

14. The method of claim 1, wherein steps (b)-(e) are performed in any order to produce the solution.

15. The method of claim 1, wherein any two or more of steps (b)-(e) are combined to produce the solution.

16. A method of treating a material comprising:
   (a) mixing solvent, brass granules, copper granules, carbon nanotubes, and graphene;
   (b) adding the mixture of step (a) to an additional mixture of brass and copper granules and mixing until all of the granules are uniformly saturated with a mixture of step (a); and
   (c) drying the mixture of step (b) to a powder to form a treated material.

17. The method of claim 16, further including mixing the treated material with one or more ferrous and/or nonferrous metal(s) in a high temperature crucible and heating until melted.

18. The method of claim 16, wherein step (a) includes mixing in a blender.

19. The method of claim 1, wherein the mixture of step (f) excludes at least one of:
   silver; and
   iron pyrite.

20. The method of claim 16, wherein the mixture of step (b) excludes at least one of:
   silver; and
   iron pyrite.

* * * * *